United States Patent [19]

Johnson et al.

[11] 4,167,316
[45] Sep. 11, 1979

[54] SONAR CONTROLLED LENS FOCUS APPARATUS

[75] Inventors: Bruce K. Johnson, Andover; George D. Whiteside, Lexington, both of Mass.

[73] Assignee: Polaroid Corporation, Cambridge, Mass.

[21] Appl. No.: 919,084

[22] Filed: Jun. 26, 1978

[51] Int. Cl.² .............................................. G03B 13/20
[52] U.S. Cl. ....................................... 354/197; 354/25; 354/195
[58] Field of Search ................. 354/25, 195, 197, 196, 354/198; 352/140, 142; 355/55, 56

[56] References Cited

U.S. PATENT DOCUMENTS

| | | | |
|---|---|---|---|
| 2,327,859 | 8/1943 | Bolsey | 354/197 |
| 3,388,650 | 6/1968 | Westphalen | 354/197 |
| 3,720,148 | 5/1973 | Harvey | 354/25 |

OTHER PUBLICATIONS

U.S. patent application Ser. No. 838,585.
U.S. patent application Ser. No. 838,581.
U.S. patent application Ser. No. 840,802.
U.S. patent application Ser. No. 839,839.
U.S. patent application Ser. No. 856,852.
U.S. patent application Ser. No. 899,270.
U.S. patent application Ser. No. 898,546.

*Primary Examiner*—Michael L. Gellner
*Attorney, Agent, or Firm*—Edward S. Roman

[57] ABSTRACT

An automatic focusing apparatus for a camera comprises a camera to photographic subject ranging device for providing a signal indication of elapsed time corresponding to the camera-to-subject distance and an objective lens arrangement displaceable between a plurality of focal positions at a rate such that the objective lens arrangement reaches each of its plurality of focal positions at an elapsed time from its initial displacement directly proportionate to the elapsed time indicated by the ranging device.

27 Claims, 4 Drawing Figures

SONAR CONTROLLED LENS FOCUS APPARATUS

BACKGROUND OF THE INVENTION

1. Field of the Invention:

This invention relates generally to an automatic focusing apparatus, and more particularly, to an economical and simple automatic sonar controlled focusing apparatus wherein lens movement and sonar ranging occur in proportionately related elapsed time intervals.

2. Description of the Prior Art:

Ultrasonic ranging systems are well known for cameras and in each of the systems, ultrasonic energy is transmitted toward a subject to be photographed, and the subject reflects the ultrasonic energy back to the camera. Characteristics of the transmitted and received signals may be compared to derive a control signal representative of subject distance. The control signal can be thereafter used to drive the lens mount of the camera to a position corresponding to the subject distance whereby the subject will be in focus.

U.S. patent application Ser. No. 840,802 entitled "Ultrasonic Ranging System for a Camera" by J. Muggli filed in common assignment herewith provides an ultrasonic ranging system for a camera having a lens mount movable to a position at which a subject being photographed is in focus. The system includes an ultrasonic transducer that responds to a keying pulse by transmitting a relatively short burst of frequency modulated ultrasonic energy and a synchronized receiver for processing an echo signal produced by the transducer upon receipt of an echo upon a predetermined time interval. The receiver produces a range signal with a characteristic related to the distance of a subject being photographed from the camera. The range signal representing the subject distance may thereafter be used in a manner as is more fully disclosed in U.S. patent application Ser. No. 729,289 to control a gated pulse generator in a nonlinear manner such that the latter produces a train of pulses whose number is representative of the actual position of the lens mount at which the subject will be in focus, and includes a focusing mechanism having means, responsive to the pulse produced by the pulse generator means for displacing the lens mount to the proper position. Such systems are complex and expensive since the range signal must be utilized to control a gated pulse in a nonlinear manner to produce a train of pulses whose number is representative of the actual position of a lens mount. The focusing mechanism must then embody a servo-mechanism to respond to the pulses produced by the pulse generator in order to mechanically displace the lens mount to the proper axial position thereby further contributing to the complex nature of such auto focus arrangements.

Therefore, it is a primary object of this invention to provide a simplified and economical automatic sonar controlled focusing apparatus wherein the lens movement occurs in an elapsed time interval which is directly proportional to the elapsed time interval between which the sonar ranging signal is transmitted and thereafter received subsequent to being reflected by the photographic subject.

It is a further object of this invention to provide a simple and automatic sonar ranging apparatus wherein the lens movement is initiated with the transmission of the sonar ranging signal and wherein the lens movement is thereafter terminated in response to the receipt of the echo from the sonar ranging signal.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An automatic focusing apparatus is provided for a camera of the type having means for receiving a power supply. The camera includes a manually accessible actuator together with means, at least in part energizable by the camera's power supply, for providing an indication of an elapsed time period which corresponds directly to a distance between the camera and a subject to be photographed. An objective lens arrangement is also provided together with means for mounting the objective lens arrangement for displacement between a plurality of focal positions. The objective lens arrangement is adapted to focus an image of a subject located at a given distance from the camera within a given range of distances at the focal plane of the camera at each of its focal positions. Means responsive to the manual operation of the actuator are provided for effecting the displacement of the objective lens arrangement so that the objective lens arrangement reaches each of its plurality of focal positions at an elapsed time from its initial displacement directly proportionate to the elapsed time indicated by the distance indication providing means in the event that a photographic subject is located from the camera at a distance at which the objective lens arrangement would focus an image thereof at the camera's focal plane. Means are also provided for stopping the displacement of the objective lens arrangement in response to the indication of camera-to-subject distance provided by the distance indication means.

In a preferred embodiment, the indication providing means comprises means for generating and transmitting a sonar ranging signal together with means for detecting an echo signal reflected from the photographic subject at an elapsed time subsequent to the transmission of the sonar ranging signal. In addition, the preferred objective lens arrangement comprises a plurality of lens elements mounted for displacement between the plurality of focal positions by a lens holding disc member disposed for rotation about a fixed center axis. The plurality of lens elements are disposed on the lens holding disc member in circumferentially spaced apart relation with respect to each other about the center axis. Each of the lens elements corresponds to a different one of the plurality of focal positions such that rotation of the lens holding member about its center axis operates to sequentially move each of the lens elements into the focal position.

DESCRIPTION OF THE DRAWINGS

The novel features that are considered characteristic of the invention are set forth with particularity in the apended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
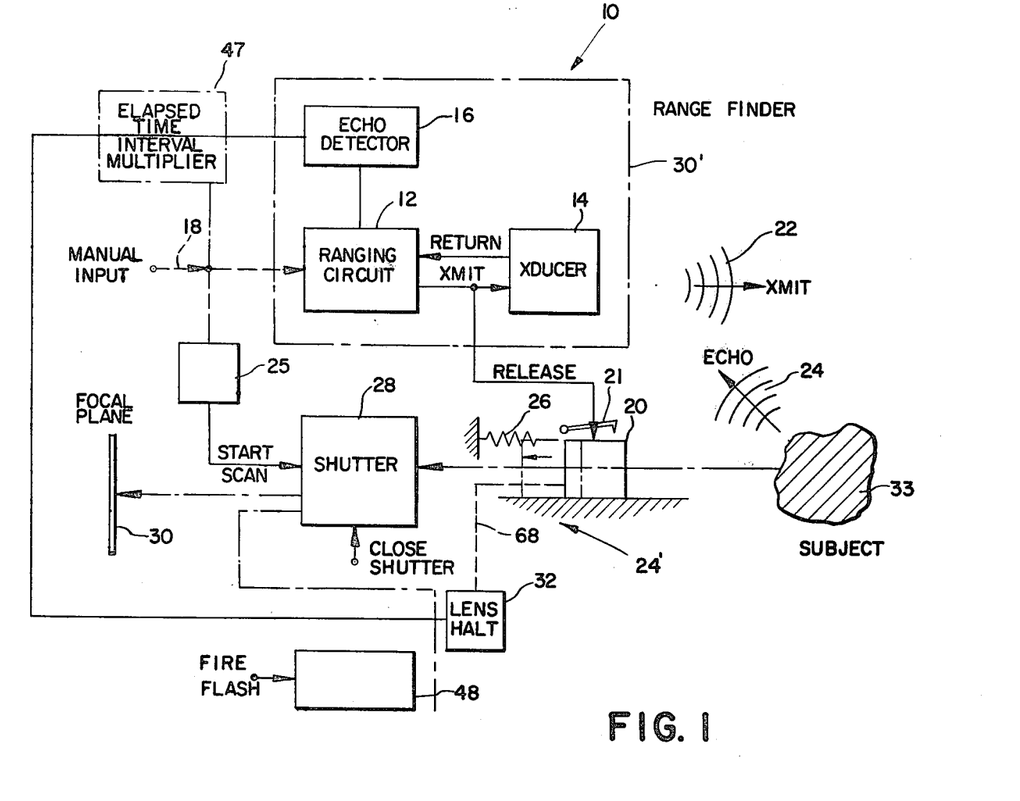
FIG. 1 is a schematic diagram of the automatic focusing apparatus of this invention.

Referring now to FIG. 1, there is shown the automatic focusing arrangement of this invention utilizing a sonic rangefinder as shown generally at 10, and which is more fully disclosed in a copending U.S. patent application Ser. No. 840,802 entitled "Ultrasonic Ranging System for a Camera" by J. Muggli filed in common assignment herewith. The sonic rangefinder 10 includes a ranging circuit 12 which is responsive to manual actuation as may be applied to a manually accessible actuator shown at 18 to issue a transmit commence signal to a sonic transducer 14 so as to cause the transmission of a sonar ranging signal comprising a burst of sonic energy as shown generally at 22. Thus, the burst of sonic energy 22 is emitted from the transducer 14 in substantial coincidence with the manual actuation as applied at 18. The transducer 14 thereafter detects an echo signal reflected from a photographic subject as shown at 33 at an elapsed time interval subsequent to the transmission of the sonar ranging signal. An echo detector 16 then provides a signal indicative of this elapsed time period which corresponds directly to the distance between the camera and the subject 33 to be photographed. The sonic rangefinder 10 thus provides a means for providing an indication of an elapsed time period which corresponds directly to the distance between the camera and a subject to be photographed for reasons which will be made more apparent in the following paragraphs.

An objective lens arrangement or assembly, as shown in simplified fashion at 20, is disposed for movement between a plurality of different focal positions. During each film exposure operation, the objective lens assembly 20 is displaced to one of its focal positions for focusing at a focal plane 30, image forming light rays from a respective photographic subject as shown at 33 located within a given range of distances from the camera. As is readily apparent, the lens assembly 20 is adapted at each of its plurality of focal positions to focus at the focal plane 30 of the camera, an image of a photographic subject located at a different distance from the camera within the given range of distances. The lens assembly 20 is biased to move through its plurality of different focal positions by a simple tension spring 26 and may be held at an initial terminal position as shown in solid lines by a releasable detent 21. The spring 26 operates to bias the lens assembly 20 to move towards another terminal position as shown by the phantom lines. The lens assembly 20 while in its initial terminal position (solid lines), may operate to focus image forming light rays from a photographic subject located at the closest possible distance to the camera within the aforementioned camera-to-subject distance range and while in its other terminal position (phantom lines) may operate to focus image forming light rays from a photographic subject located at the furthest possible distance from the camera within the aforementioned camera-to-subject distance range. Thus, the movement of the lens assembly 20 from its initial terminal position toward its other terminal position operates to progressively focus image forming rays for corresponding subjects located at progressively increasing distances from the camera.

Camera operation is commenced upon manual actuation of the acutator 18 which causes the ranging circuit 12 to issue a transmit commence signal to the sonic transducer 14. The detent 21 is withdrawn in response to the transmit command issued by the ranging circuit 12 thereby releasing the lens assembly 20 to move from its close up focus position (solid lines) toward its far distance focus position (phantom lines). A lens halting or latching mechanism as shown generally at 32 operates in response to the output of the echo detector 16 which detects the echo signal reflected from the photographic subject at an elapsed time interval subsequent to the transmission of the sonar ranging signal. The latch mechanism 32 thereby operates to interrupt the movement of the lens assembly 20 subsequent to its initial displacement from its close up focus position at an elapsed time interval which correlates to the elapsed time interval between transmission of the sonar ranging signal and receipt of the echo from the photographic subject. The photographic subject will thus be focused in the elapsed time interval "real time" between the transmission of the sonar ranging signal and receipt of the echo by the sonic rangefinder 10. After the lens assembly 20 is moved to its desired focal position in the aforementioned manner, a photographic exposure operation may be commenced by way of a shutter mechanism shown generally at 28 which commences exposure after a predetermined time delay 25 subsequent to the manual actuation at 18. As is readily apparent, the determined time delay 25 is selected to be of sufficient duration to accommodate both the aforementioned ranging and focusing operations.

Thus, the lens assembly 20 herein described is focused in "real time" in that the lens system is moved through its plurality of differing focal positions in concert with the transmission of the sonar ranging signal. As will be readily understood, the dynamic characteristic of the lens assembly 20 drive, which in the aforementioned example constitutes the spring 26, operates to move the lens assembly 20 through its plurality of focal positions at a rate such that the lens assembly 20 reaches each one of its plurality of focal positions at substantially the same time at which an echo from the sonar ranging signal would be received by the echo detector 16 subsequent to being reflected from a subject located at the camera-to-subject distance directly corresponding to that one focal position.

It will also be understood that the lens assembly 20 may also be moved at a slower rate whereupon the elapsed time interval between transmission of the sonar ranging signal and receipt of the echo signal must be multiplied as shown by the phantom line box 47 by a constant factor corresponding to the slower lens rate. Thus, the elapsed time interval between initial displacement of the lens assembly 20 and its halting by the latch mechanism 32 need not be exactly the same as the elapsed time interval between transmission and receipt of the sonar ranging signal, but may instead be some constant multiple thereof. In addition, it will also be readily apparent that the initial displacement of the lens assembly 20 need not occur simultaneously with the transmission of the sonar ranging signal, but may alternatively occur at some time subsequent to the transmission of the sonar ranging signal so long as the elapsed time interval between initiation and halting of the lens assembly 20 displacement is directly proportionate to the elapsed time interval between transmission and receipt of the sonar ranging signal.

Figure 2:
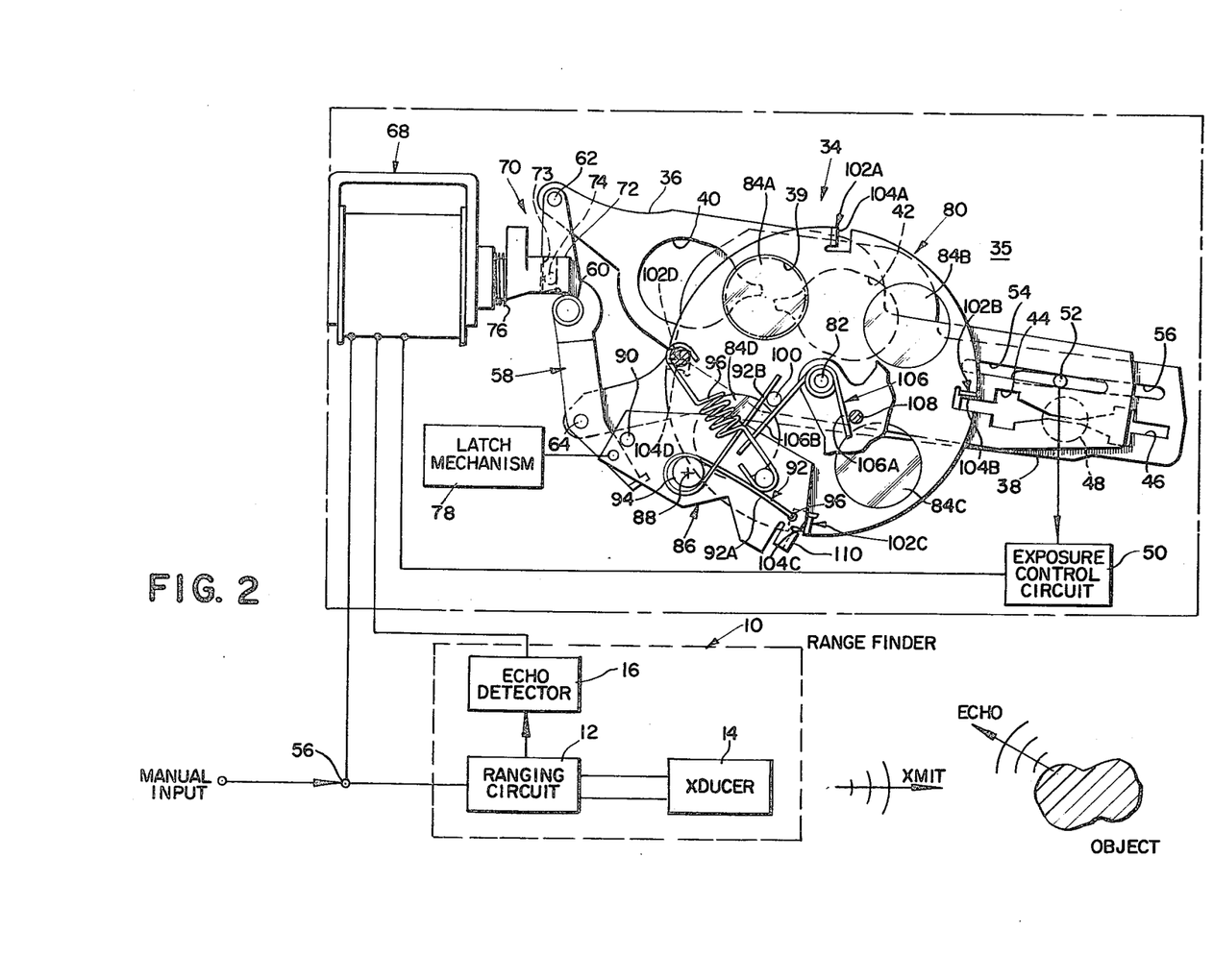
FIG. 2 is a front view showing a preferred embodiment for the automatic focusing apparatus of FIG. 1.

Referring now to FIG. 2, there is shown in greater detail an automatic focusing apparatus of the aforementioned type which is compatible for use with a "scanning type" shutter blade mechanism. One such well-known shutter mechanism comprises two overlapping shutter blade elements 36 and 38 disposed for reciprocal sliding movement with respect to each other on a baseblock casting 35 in the following manner. The shutter blade elements 36 and 38 are provided respectively with a pair of scene light admitting primary apertures 40 and 42 to collectively define a progressive variation of effective aperture openings in accordance with simultaneous longitudinal and lateral displacement of one blade element with respect to the other blade element in a manner as is fully described in U.S. Pat. No. 3,942,183 entitled "Camera With Pivoting Blades" by George D. Whiteside, issued Mar. 2, 1976 and assigned in common herewith. The primary apertures 40 and 42 are selectively shaped so as to overlap a light entry exposure opening 39 in the baseblock casting 35 thereby defining a varying effective aperture size as a function of the position of the blade elements 36 and 38.

Each of the blades 36 and 38 may additionally be configured to have corresponding photocell sweep secondary apertures shown respectively at 44 and 46. Secondary apertures 44 and 46 may be configured in correspondence with the shapes of scene light admitting primary apertures 40 and 42. As is readily apparent, the secondary apertures 44 and 46 also move in correspondence with the primary apertures 40 and 42 to define a small secondary aperture for admitting the passage of scene light from the scene being photographed to a scene light detecting station as shown generally at 48. The scene light detecting station 48 includes a photoresponsive element (not shown) which cooperates with a light integrating and control circuit 50 as is more fully described in a U.S. Pat. No. 4,023,187 entitled "Exposure Control System with Fill Flash Race Condition" by E. K. Shenk. In this manner, the exposure interval can be terminated as a function of the amount of light received through the secondary effective aperture defined by the overlapping photocell sweep apertures 44 and 46.

Projecting from the base block casting 35 at a location spaced laterally apart from the light entry exposure opening 39, is a pivot pin or stud 52 which pivotally and translatably engages elongated slots 54 and 56 formed in respective shutter blade elements 36 and 38. Pin 52 may be integrally formed with the base block casting 35 and blade elements 36 and 38 may be retained in engaging relation with respect to the pin 52 by any suitable means such as peening over the outside end of the pin 52.

The opposite ends of the blade elements 36 and 38 respectively include extended portions which pivotally connect to a walking beam 58. The walking beam 58, in turn, is disposed for rotation relative to the base block casting 35 by pivotal connection to a projecting pivot pin or stud 60 which may also be integrally formed with the base block casting 35 at a location spaced laterally apart from the light entry exposure opening 39. The walking beam 58 may be pivotally retained with respect to the pin 60 by conventional means such as an E-ring (not shown). In the preferred mode, the walking beam 58 is pivotally connected at its distal ends to the shutter blade elements 36 and 38 by respective pin members 62, 64 which extend laterally outward from the walking beam 58.

Drive means are provided for displacing the blade mechanism and include a tractive electromagnetic device in the form of a solenoid 68 employed to displace the shutter blades 36 and 38 with respect to each other and the casting 35. The solenoid 68 includes an internally disposed cylindrical plunger unit 70 which retracts inwardly into the body of the solenoid upon energization of the solenoid winding. The solenoid plunger 70 includes an end cap 72 at the outside end thereof together with a vertical groove or slot 72 for loosely engaging a pin 74 extending outwardly from the walking beam 58. In this manner, the solenoid plunger 70 is affixed to the walking beam 58 so that longitudinal displacement of the plunger 70 will operate to rotate the walking beam around the pivot pin 60 so as to appropriately displace the shutter blades 36 and 38. This drive means may additionally include a compression spring 76 around the plunger 70 so as to continuously urge the end cap 72 outward of the solenoid 68 thereby also continuously urging the blade elements 36 and 38 into positions defining their largest effective aperture over the light entry exposure opening 39. As will be readily understood, in some shutter blade arrangements, it may be preferable to utilize a tension spring in place of the compression spring 76 in a manner as is shown in U.S. Pat. No. 3,942,183 entitled "Camera With Pivoting Blades" issued Mar. 2, 1976. Thus, with the spring connection herein described, the shutter blade mechanism is biased to continuously urge the shutter blade elements 36 and 38 into an open orientation.

Figure 3:
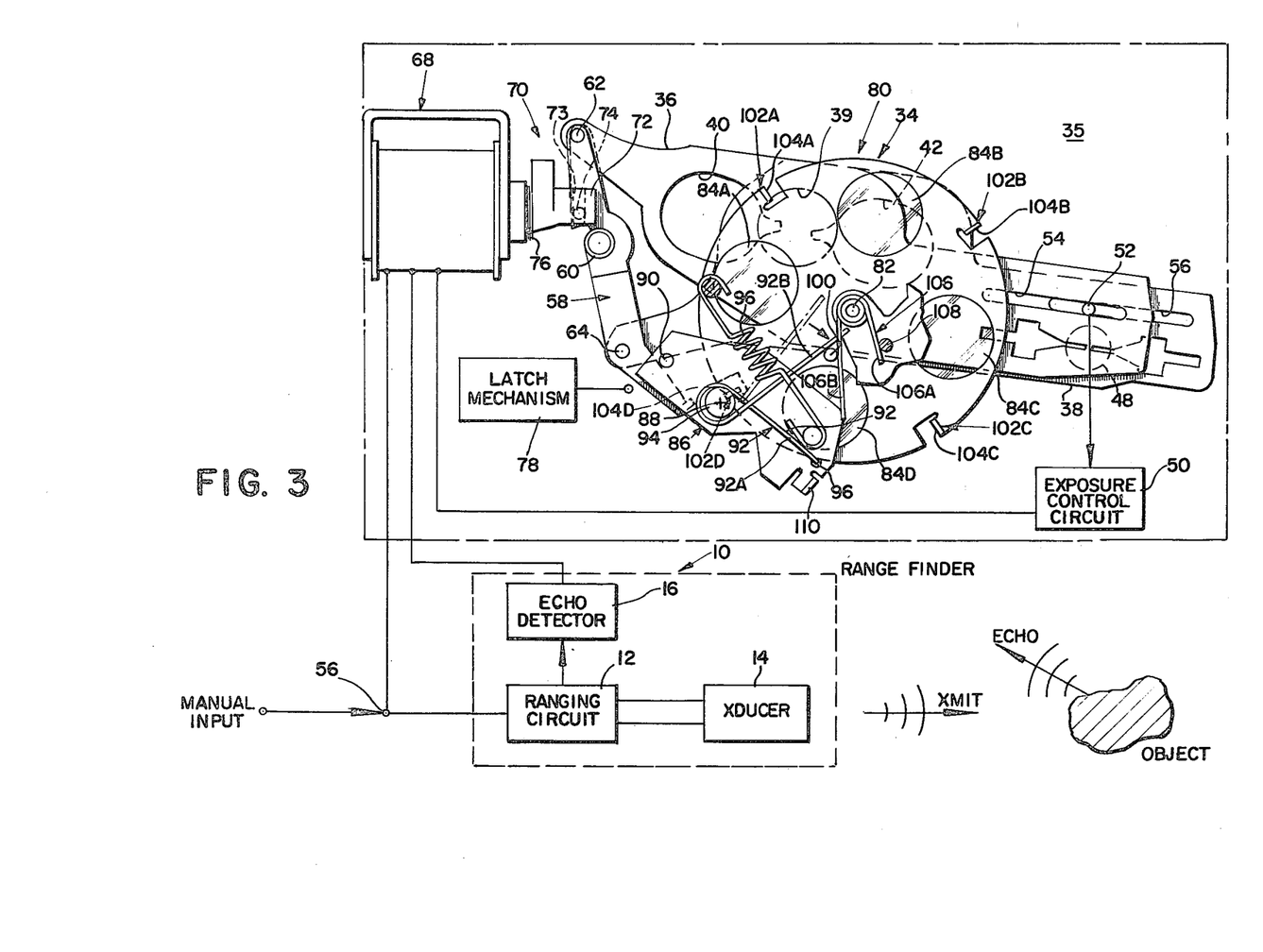
FIG. 3 is a front view showing the apparatus of FIG. 2 in a different mode of operation.

Whereas the solenoid 68 cannot be continuously energized to maintain the shutter blade mechanism in its scene light blocking position as shown in FIG. 2, particularly during extended periods of time during which the camera is not in use, there is provided a latch mechanism as shown generally at 78 which operates in a manner as is more fully described in U.S. Pat. No. 4,040,072, entitled "Shutter Latch Arrangement Releasable Through Shutter Blade Actuation and Resettable Through Film Advancement", by B. Johnson, et al, issued Aug. 2, 1977 in common assignment herewith. The shutter latch mechanism 78 operates automatically at the end of each exposure operation to latch the walking beam 58 in its scene light blocking position as shown in FIG. 2 thereby permitting the deenergization of the solenoid 68. The latch mechanism 78 is unlatched from the walking beam 58 upon the commencement of the exposure operation by an initial energization of the solenoid 68 to provide a limited pivotal movement to the walking beam 58 from its initial scene light blocking position as shown in FIG. 2 to another scene light blocking position as shown in FIG. 3 as is more fully described in U.S. Pat. No. 4,040,072, supra.

The aforementioned lens system 20 may comprise a plurality of lens elements 84A–84D. A disc-like lens holding member 80 disposed for rotation about a center pivot pin or axis 82 which may also project outward of the base block casting 35 provides means for mounting the plurality of lens elements 84A–84D. The plurality of lens elements 84A–84D are disposed on the lens holding member 80 in circumferentially spaced apart relation with respect to each other about the pivot pin 82. Each of the lens elements 84A–84D has a different focal length and depth of field characteristic and corresponds respectively to a different one of the plurality of focal positions. Rotation of the lens holding member 80 about the pivot pin 82 operates to sequentially move each of the lens elements 84A–84D into position overlying the exposure opening 39 in the base block casting 35 so as to sequentially focus images onto the focal plane 30 of the camera of photographic subjects located at progressively increasing distances from the camera. As will be readily understood by those skilled in the art, additional lens elements (not shown) may be provided in fixed optical alignment with the exposure opening 39 to cooperate with the lens elements 84A–84D in defining the objective lens arrangement for the camera. Thus, one of the lens elements 84A–84D may be entirely omitted with an open space provided in its place whereupon the additional lens elements provided in optical alignment with the exposure opening 39 would operate by themselves to define the camera objective when the open space is rotated over the exposure opening 39. Thus, the lens elements 84A–84D would preferably be relatively weak in comparison with the other lens elements (not shown) in optical alignment therewith when overlapping the exposure opening 39.

An actuator and latch member as shown generally at 86 is disposed for pivotal movement about another axis 88 spaced apart from the lens holding member pivot pin 82. The actuator and latch member 86 includes a depending integral pin member 90 extending laterally outward therefrom for engagement by the leading edge of the walking beam 58 in a manner to be subsequently described. The actuator and latch member 86 is adapted to carry a torsion spring 92 thereon by means of another integral depending pin member 94 in cooperation with an aperture 96 which engages one end of one end of a leg 92A of the torsion spring 92. The other leg 92B of the torsion spring 92 extends outward of the actuator and latch member 86 in potential impacting engagement with an integral depending pin member 100 from the lens holding member 80 for reasons which will become apparent from the following discussion.

The lens holding member 80 is further provided with a plurality of circumferentially spaced apart integral depending teeth members 102A–102D disposed about the periphery thereof in correspondence with respective lens elements 84A–84D. The teeth members 102A–102D define respective stop surfaces 104A–104D which may be individually engaged by an integral depending projection or stop surface 110 extending laterally outward from the actuator and latch member 86. A tension spring 96 fixedly connected at one end with respect to the base block casting 35 and fixedly connected at its other end to the actuator and latch member 86 provide means for yieldably biasing the actuator and latch member 86 to rotate in a counterclockwise direction about the axis 88. Means comprising a torsion spring 106 having one arm 106A thereof engaged against a fixed pin 108 from the baseblock casting 35 and another arm 106B thereof engaged against the pin 100 are provided for resiliently biasing the lens holding member 80 to return to its initial position subsequent to its being impacted in the foregoing manner by the torsion spring 92 as will be more fully discussed.

Operation may be initiated in the aforementioned manner by applying a manual actuation to the actuator 18. This, in turn, operates to cause the ranging circuit 12 to issue a transmit command signal to sonic transducer 14 thereby causing a sonic ranging signal to be emitted from the transducer 14 in substantial coincidence with the manual actuation at 18. The manual actuation at 18 also simultaneously operates to effect energization of the solenoid 68 so as to retract the plunger 70 inwardly and effect a quick limited pivotal movement of the walking beam 58 from its position as shown in FIG. 2 to its position as shown in FIG. 3. During the aforementioned limited pivotal movement of the walking beam 58, the leading edge thereof engages the pin member 90 so as to impart a sudden quick clockwise rotation to the actuator and latch member 86 about its axis 88. Clockwise rotation of the actuator and latch member 86, in turn, operates to cause the end of the leg 92B of the torsion spring 92 to impact upon the lens holding member 80 by way of the pin member 100 so as to rotate the lens holding member 80 and its associated lens elements 84A–84D in a counterclockwise direction about the pivot pin 82 thereby sequentially moving each of the lens elements 84A–84D into focal positions overlapping the light entry exposure opening 39.

As is readily apparent, the torsion spring 106 is tensioned so as to yield to the impact made on the lens holding member 80 by the torsion spring 92. In this manner, there is provided a resilient member such as the torsion spring 92 together with means for movably mounting the torsion spring 92 (actuator and latch member 86) in potential impacting relation with respect to the lens holding member 80 with the actuator and latch member 86 being actuable in correspondence with the transmission with the sonar ranging signal to move the torsion spring to impact upon the lens holding member 80 so as to rotate the lens holding member 80 and its associated lens holding elements 84A–84D about the pivot pin 82.

Figure 4:
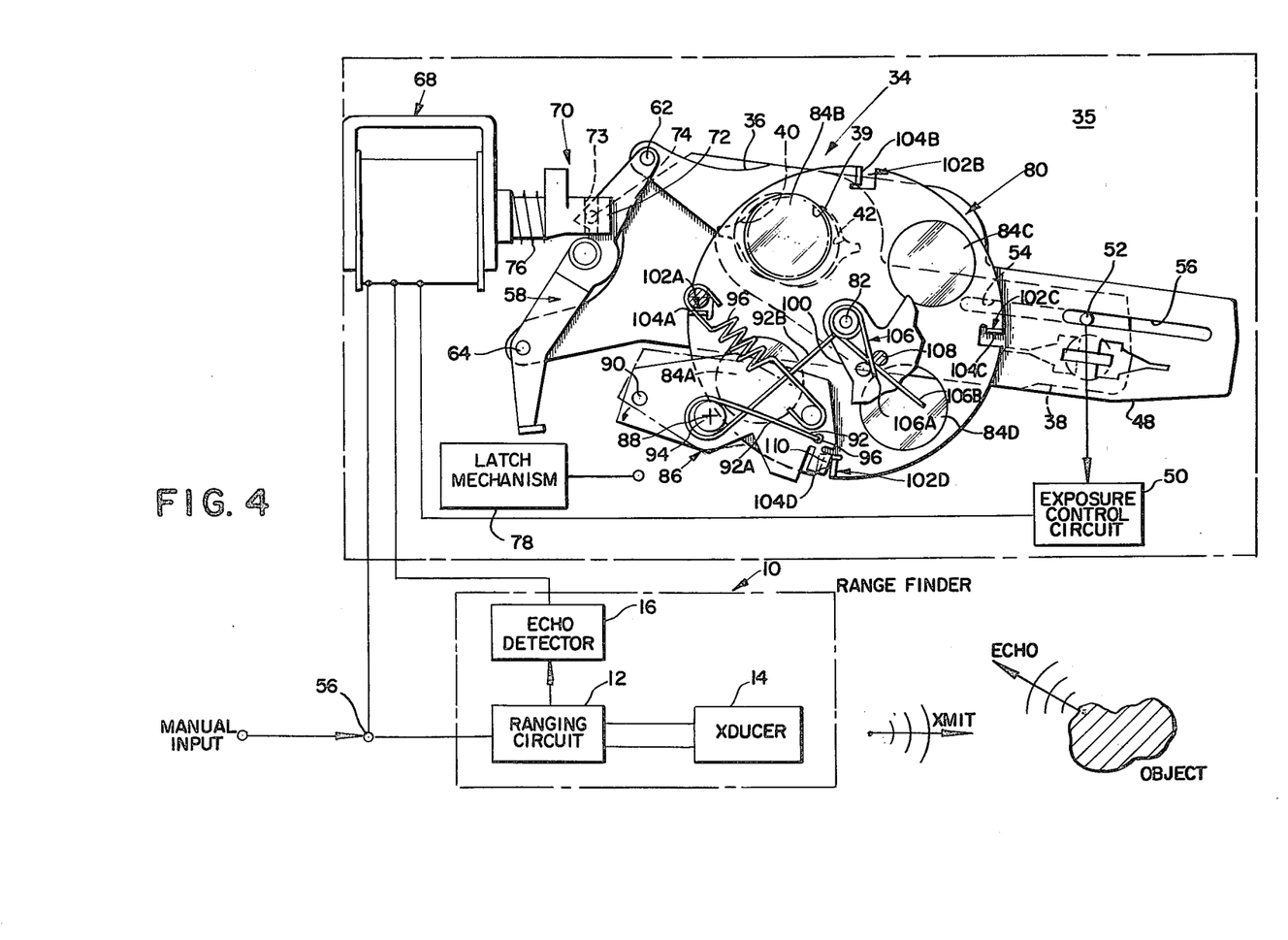
FIG. 4 is a front view showing the apparatus of FIG. 2 in still another mode of its operation.

Receipt of the echo from the sonar ranging signal by the transducer 14 actuates the echo detector 16 to provide an output signal which deenergizes the solenoid 68 so as to permit the walking beam 58 to be rotated under the influence of the compression spring 76 in a clockwise direction from its position as shown in FIG. 3 to its position as shown in FIG. 4 wherein the primary apertures 40 and 42 of the shutter blade elements 36 and 38 respectively define their maximum scene light admitting aperture. Such clockwise rotation of the walking beam 58 operates initially to disengage the edge of the walking beam 58 from the pin 90 so as to permit the actuator and latch member 86 to be rotated in a counterclockwise direction about the pivot axis 88 under the urging influence of its biasing tension spring 96. Thus, the stop surface 110 of the actuator and latch member 86 is moved into the locus of travel of the latching teeth 102A–102D so as to engage a respective one of the teeth 102A–102D and thereby preclude further counterclockwise rotation of the lens holding member 80. The torsion spring 106 thereafter biases the lens holding member 80 to rotate in the opposite clockwise direction until the stop surface associated with the next adjacent tooth (104D) engages the actuator and latch member stop surface 110 thereby stopping the lens holding member 80 in position to index the appropriate lens element (84B) over the light entry exposure opening 39 as shown in FIG. 4.

Engagement of the respective complementary stop surfaces operates to stop the lens holding member 80 at precisely the same instant that the sonar ranging signal is received by the echo detector 16. Thus, the lens element indexed in this manner has a focal length and depth of field characteristic appropriate for focusing image forming rays from a subject located at the sonar determined distance from the camera.

The actuator and latch member 86 and its associated torsion spring 92 thereby provide a lens positioning means which is actuable in correspondence with the transmission of a sonar ranging signal for moving the lens holder 80 and its associated lens elements 84A–84D through a plurality of different focal positions. The lens holder 80 is moved at a rate such that the appropriate lens element is moved in position overlying the exposure opening 39 at substantially the same elapsed time at which the echo from the sonar ranging signal is received by the echo detector 16 subsequent to being transmitted and reflected from a subject located at the camera-to-subject distance directly corresponding to the focal characteristic of the overlying lens element (84B). The actuator and latch member 86 further provides a means for stopping the lens holding member 80 movement at the appropriate one of its plurality of focal positions in response to receipt of the echo from the sonar ranging signal which was previously transmitted in correspondence with the actuation of the actuator and latch member 86. Although the elapsed time between starting and stopping the lens disc 80 is substantially the same as the elapsed time between transmission and receipt of the sonar ranging signal, it will again be readily appreciated that such elapsed time intervals need only be directly proportional to each other in the event that the lens disc 80 is moved at a slower rate as previously discussed.

Upon the determination of the correct exposure by the light integrating and control circuit 50, there is applied a control signal operative to energize the solenoid 86 and withdraw the plunger 70 therein so as to rotate the walking beam 58 in a counterclockwise direction from its scene light admitting position as shown in FIG. 4 back to its scene light blocking position as shown in FIG. 2 wherein the latch mechanism 78 is automatically reset in the manner as described in U.S. Pat. No. 4,040,072 supra. As is readily apparent, such counterclockwise rotation of the walking beam 58 operates to move the leading edge thereof again into engagement with the pin member 90 to as to rotate the actuator and latch member 86 in a clockwise direction against the yieldable bias of the tension spring 96. Such clockwise rotation of the actuator latch member 86 operates to move the stop surface 110 out of engagement with the stop surface 104D thereby permitting the lens holding member 80 to be rotated in a clockwise direction about its pivot pin 82 under the urging influence of its biasing torsion spring 106. Thus, the lens holding member 80 and its associated lens element 84A–84D automatically return to their initial terminal position in readiness for another automatic focusing operation upon a subsequent manual actuation of the actuator 18.

In this manner, there is thus provided an automatic sonar controlled "real time" focusing apparatus, the control of which may be integrated in an economical manner with that of a conventional "scanning type" shutter blade mechanism. The automatic focusing occurs during "real time" since the lend holding member 80 is rotated during an elapsed time period which directly corresponds with the elapsed time period between which the sonar ranging pulse is transmitted and received. Thus, the sonar signal directly controls the actuation and stoppage of the lens holding member 80 thereby eliminating the need for a complex servo-controlled lens drive mechanism actuated only subsequent to the determination of a range responsive signal.

Although the lens holding member 80 has been described as holding four lens elements 84A through 84D, it will be readily apparent that either more or less lens elements may be provided on the lens holding member 80 depending upon the degree of resolution that is desired. In addition, the lens holding member 80 and its associated lens elements 84A–84D may comprise an integrally molded unitary plastic structure economically fabricated by conventional injection molding techniques. As is readily apparent, each lens element 84A–84D is designed to have a particular depth of field characteristic extending over a select portion of the entire camera-to-subject distance range over which the apparatus is intended to be used. Thus, counterclockwise rotation of the lens holding member 80 as provided by the impact of the torsion spring 92 upon the pin 100 may operate to sequentially move lens elements with progressively increasing focal lengths across the exposure opening 39.

Since certain changes may be made in the above-described embodiment without departing from the scope of the invention herein involved, it is intended that all the matter contained in the above description as shown in accompanying drawings be interpreted as illustrative and not in a limiting sense.

What is claimed is:

1. A camera having means for receiving a power supply, said camera comprising:
   a manually accessible actuator;
   means for generating and transmitting a sonar ranging signal and for providing an indication upon detection of an echo signal reflected from a photographic subject at an elapsed time subsequent to the transmission of the sonar ranging signal;
   an objective lens arrangement;
   means for mounting said objective lens arrangement for displacement between a plurality of focal positions, said objective lens arrangement being adapted to focus an image of a subject located at a different distance from said camera within a given range of distances at the focal plane of said camera at each of its said focal positions; and
   means responsive to the manual operation of said actuator and at least in part energizable by the camera's power supply for effecting the displacement of said objective lens arrangement and the operation of said sonar ranging means so that said objective lens arrangement reaches each of its said plurality of focal positions at a time correlated to an indication of an echo signal being provided from said sonar ranging means in the event that a subject is located from said camera at a distance at which said objective lens arrangement would focus an image thereof at the camera's focal plane, said last stated means being operative to displace said objective lens arrangement from one of its said focal positions towards another of its said focal positions prior to an indication of an echo signal being provided by said sonar ranging means.

2. The camera of claim 1 including means for stopping the displacement of said objective lens arrangement in response to the indication of an echo signal provided by said sonar ranging means.

3. The camera of claim 2 including a shutter blade mechanism and means for mounting said blade mechanism for displacement between at least one arrangement wherein it blocks scene light from reaching the focal plane and another arrangement wherein it defines a maximum size aperture, said blade mechanism serving to define a range of progressively increasing sized apertures for admitting scene light to the camera focal plane as it moves from its said scene light blocking arrangement toward its said scene light admitting arrangement.

4. The camera of claim 3 wherein said lens mounting means comprises a lens holding member disposed for rotation about a center axis and said objective lens arrangement comprises a plurality of lens elements disposed on said lens holding member in circumferentially spaced apart relation with respect to each other about said center axis, with each of said lens elements corresponding to a different one of said plurality of focal positions such that rotational displacement of said lens holding member about said center axis by said displacement means operates to sequentially move each of said lens elements into its said one focal position.

5. The camera of claim 4 wherein said sonar ranging signal is transmitted simultaneously with the initiation of rotational displacement of said lens holding member by said displacing means.

6. A camera having means for receiving a power supply, said camera comprising:
a manually accessible actuator;
means at least in part energizable by the camera's power supply for generating and transmitting a sonar ranging signal and for providing an indication upon detection of an echo signal reflected from a photographic subject at an elapsed time subsequent to the transmission of the sonar ranging signal;
an objective lens arrangement;
means for mounting said objective lens arrangement for displacement between a plurality of focal positions, said objective lens arrangement being adapted to focus an image of a subject located at a different distance from said camera within a given range of distances at the focal plane of said camera at each of its said focal positions; and
means responsive to the manual operation of said actuator for effecting the displacement of said objective lens arrangement so that said objective lens arrangement reaches each of its said plurality of focal positions at an elapsed time from its initial displacement directly proportionate to said elapsed time indicated upon the receipt of said echo signal by said sonar ranging means in the event that a photographic subject is located from said camera at the distance at which said objective lens arrangement would focus an image thereof at the camera's focal plane.

7. The camera of claim 6 including means for stopping the displacement of said objective lens arrangement in response to the indication of receipt of the echo signal provided by said sonar ranging means.

8. The camera of claim 7 including a shutter blade mechanism and means for mounting said blade mechanism for displacement between at least one arrangement wherein it blocks scene light from reaching the focal plane and another arrangement wherein it defines a maximum size aperture, said blade mechanism serving to define a range of progressively increasing sized apertures for admitting scene light to the camera focal plane as it moves from its said scene light blocking arrangement toward its said scene light admitting arrangement.

9. The camera of claim 8 wherein said lens mounting means comprises a lens holding member disposed for rotation about a center axis and said objective lens arrangement comprises a plurality of lens elements disposed on said lens holding member in circumferentially spaced apart relation with respect to each other about said center axis, with each of said lens elements corresponding to a different one of said plurality of focal positions such that rotational displacement of said lens holding member about said center axis by said displacement means operates to sequentially move each of said lens elements into its said one focal position.

10. The camera of claim 9 wherein said sonar ranging signal is transmitted simultaneously with the initiation of rotational displacement of said lens holding member by said displacing means.

11. A camera having means for receiving a power supply and means for defining a focal plane, said camera comprising:
a manually accessible actuator;
a plurality of discrete lens elements each having a different focal length;
means for holding said plurality of lens elements in circumferentially spaced apart relation with respect to each other for rotation about a center axis, rotation of said lens holding means from an initial position operating to sequentially move each of said lens elements into position to focus an image onto the camera focal plane of a photographic subject located at a different camera-to-subject distance corresponding to the focal length of the positioned lens; and
control means responsive to the manual operation of said actuator and at least in part energizable by the camera's power supply for rotatably driving said lens holding means to sequentially move each of said lens elements into its said focus position and for effecting a photographic exposure cycle.

12. The camera of claim 11 wherein said control means comprises a shutter blade mechanism and means for mounting said blade mechanism for displacement between at least one arrangement wherein it blocks scene light from reaching the focal plane and another arrangement wherein it defines a maximum size aperture, said blade mechanism serving to define a range of progressively increasing sized apertures for admitting scene light to the camera focal plane as it moves from its said scene light blocking arrangement toward its said scene light admitting arrangement, said control means further including means for rotatably driving said lens holding means to sequentially move each of said lens elements into its said focus position during displacement of said blade mechanism.

13. The camera of claim 12 wherein said control means includes means for stopping the rotation of said lens holding means to station one of said lens elements at its said focus position prior to the displacement of said blade mechanism into its said aperture range.

14. The camera of claim 11 wherein said control means comprises a shutter blade mechanism and means for mounting said blade mechanism for displacement between at least one arrangement wherein it blocks scene light from reaching the film plane and another arrangement wherein it defines a maximum size aperture, said blade mechanism serving to define a range of progressively increasing sized apertures for admitting scene light to the camera focal plane as it moves from its said scene light blocking arrangement toward its said scene light admitting arrangement, said control means further including means responsive to the initial displacement of said blade mounting means for rotatably driving said lens holding means to sequentially move each of said lens elements into its said focus position.

15. The camera of claim 14 wherein said control means includes means for stopping the rotation of said lens holding means to station one of said lens elements at its said focus position and means for yieldable urging said lens holding means to rotate back to its said initial position upon the release of said lens holding means by said stopping means.

16. The camera of claim 15 wherein said control means includes a member disposed for rotation about an axis spaced apart from said lens holding means center axis, said rotatable member having a portion thereof disposed for engagement by said blade mounting means upon the displacement thereof, and a resilient element connected to said rotatable member with one end thereof extending outward of said rotatable member for impacting engagement against said lens holding means such that displacement of said blade mounting means operates to engage and rotate said rotatable member about its said axis thereby impacting said resilient element against said lens holding means so as to rotate said lens holding means about its said center axis, said control means further including another resilient element for yieldably biasing said lens holding means to rotate in the direction opposite to its said direction of immediate rotation subsequent to being impacted.

17. A camera having means for defining a focal plane comprising:
   a shutter blade mechanism;
   means for mounting said blade mechanism for displacement between at least one arrangement wherein it blocks scene light from reaching the focal plane and another arrangement wherein it defines a maximum size aperture, said blade mechanism serving to define a range of progressively increasing sized apertures for admitting scene light to the camera focal plane as it moves from its said scene light admitting arrangement;
   an objective lens arrangement;
   means for mounting said objective lens arrangement for displacement between a plurality of focal positions, said objective lens arrangement being adapted to form an image of a subject located at a different distance from said camera within a given range of distances at the focal plane of said camera at each of its said focal positions; and
   means responsive to the displacement of said blade mounting means for displacing said objective lens arrangement between its said plurality of focal positions.

18. A sonar controlled focusing apparatus for automatically focusing image forming rays at a camera focal plane, said apparatus comprising:
   objective lens means disposed for movement to one of a plurality of different focal positions during each film exposure operation for focusing at the focal plane image forming light rays from a respective photographic subject located within a given distance range from the camera wherein each one of said plurality of focal positions directly corresponds to a respective camera-to-subject distance within said subject distance range;
   means for generating and transmitting a sonar ranging signal;
   means for detecting an echo signal reflected from the photographic subject at an elapsed time subsequent to the transmission of the sonar ranging signal;
   lens positioning means actuable in correspondence with the transmission of a sonar ranging signal by said generating and transmitting means for moving said lens means through its said plurality of focal positions at a rate such that said lens means reaches any one of its said plurality of focal positions at an elapsed time from its initial displacement directly proportionate to said elapsed time at which the echo from the corresponding sonar ranging signal is received by said detecting means subsequent to being reflected from a subject located at the camera-to-subject distance directly corresponding to said one of its said plurality of focal positions, said lens positioning means further including latch means for stopping said lens means movement at said one of its said plurality of focal positions in response to receipt of the echo from the sonar ranging signal previously transmitted in correspondence with the actuation of said positioning means; and
   means for returning said lens means to a select one of said plurality of different focal positions subsequent to a film exposure operation.

19. The sonar controlled focusing apparatus of claim 18 wherein said lens means includes a lens holding member disposed for rotation about a fixed axis and a plurality of lens elements disposed on said lens holding member in circumferentially spaced apart relation with respect to each other about said axis, with each of said lens elements corresponding to a different one of said plurality of focal positions such that rotation of said lens holding member about said fixed axis operates to sequentially move each of said lens elements into its said one focal position.

20. The sonar controlled focusing apparatus of claim 19 wherein said lens positioning means includes a resilient member and means for movably mounting said resilient member in potential impacting relation with respect to said lens holding member, said movable mounting means being actuable in correspondence with the transmission of the sonar ranging signal to move said resilient member to impact upon said lens holding member so as to rotate said lens holding member and its associated lens elements about said fixed axis thereby sequentially moving each of said lens elements into its said one focal position.

21. The sonar controlled focusing apparatus of claim 20 wherein said latch means includes a plurality of stop surfaces fixedly connected with respect to said lens holding member with each of said stop surfaces corresponding to a respective lens element, and a complementary single stop surface fixedly connected to said movable mounting means such that movement of said movable mounting means in a direction opposite to the direction required to impact said resilient member upon said lens holding member operates to move respective ones of said complementary stop surfaces into engaging relation with respect to each other so as to stop rotational movement of said lens holding member at one of its said plurality of focal positions, and means for yieldably biasing said movable mounting means to move in said opposite direction toward which said complementary stop surfaces engage each other.

22. The sonar controlled focusing apparatus of claim 21 wherein: said movable mounting means includes an actuator and latch member disposed for pivotal movement about another fixed axis spaced apart from said lens holding member axis with said stop surface depending outwardly from said actuator and latch member, said resilient member including a torsion spring having one end extending outward of said actuator and latch member for impacting engagement against said lens holding member such that pivotal rotation of said actuator and latch member in one direction operates to impact said one end of said torsion spring against said lens holding member so as to rotate said lens holding member while subsequent pivoting of said actuator and latch member in said opposite direction under the urging influence of said yieldable biasing means operates to move respective ones of said complimentary stop surfaces into engaging relation with respect to each other while simultaneously moving said one end of said torsion spring out of impacting relation with respect to said lens holding member.

23. The sonar controlled focusing apparatus of claim 22 wherein said return means includes a resilient biasing element for rotating said lens holding member in the direction opposite to which said lens holding member is rotated upon said impact by said torsion spring, said return means biasing element being structured to yield to the impact on said lens holding member made by said torsion spring.

24. The sonar controlled focusing apparatus of claim 19 for use with a camera of the type having scanning shutter blade elements, a pivotally disposed walking beam for imparting general reciprocal sliding movement to the shutter blade elements, a resilient biasing element for yieldably urging the walking beam to rotate in a direction of progressively increasing shutter aperture size, a tractive electromagnetic device for rotating the walking beam in a direction of progressively decreasing shutter aperture size and a latch mechanism for holding the walking beam and shutter blade elements in a scene light blocking arrangement against the yieldable urging of the walking beam biasing element wherein the shutter blade elements are unlatched by way of an initial energization of the tractive electromagnetic device to provide a limited pivotal movement to the walking beam without opening the shutter blade aperture wherein said lens positioning means includes a resilient member and means for movably mounting said resilient member in a potential impacting relation with respect to said lens holding member, said movable member being actuable in correspondence with the limited pivotal movement of the walking beam upon the initial energization of the tractive electromagnetic device to unlatch the shutter blade elements and in correspondence with the transmission of the sonar ranging signal to move said resilient member to impact upon said lens holding member so as to rotate said lens holding member and its associated lens elements about its said fixed axis thereby sequentially moving each of said lens elements into its said one focal position.

25. The sonar controlled focusing apparatus of claim 24 wherein said latch means includes a plurality of stop surfaces fixedly connected with respect to said lens holding member with each of said stop surfaces corresponding to a respective lens element and a complimentary single stop surface fixedly connected to said movable mounting means such that movement of said movable mounting means in a direction opposite to the direction required to impact said resilient member upon said lens holding member operates to move respective ones of said complimentary stop surfaces into engaging relation with respect to each other so as to stop rotational movement of said lens holding member at one of its said plurality of focal positions, and means for yieldably biasing said movable mounting means to move in said opposite direction toward which said complementary stop surfaces engage each other.

26. The sonar controlled focusing apparatus of claim 25 wherein said movable mounting means includes an actuator and latch member disposed for pivotal movement about another fixed axis spaced apart from said lens holding member axis with said stop surface depending outwardly from said actuator and latch member, and said resilient member includes a torsion spring having one end extending outward of said actuator and latch member for impacting engagement against said lens holding member such that the limited pivotal movement imparted to the walking beam upon the initial energization of the tractive electromagnetic device to unlatch the shutter blade elements operates to impart a pivotal rotation to said actuator and latch member in one direction thereby impacting said one end of said torsion spring against said lens holding member so as to rotate said lens holding member whereupon subsequent deenergization of the tractive electromagnetic device operates to allow the walking beam to be rotated in the direction of progressively increasing aperture size to commence an exposure interval occuring in response to receipt of the echo signal from the sonar ranging signal and simultaneously releases said actuator and latch member to allow it to pivot in said opposite direction under the urging influence of said yieldable biasing means to move respective ones of said complementary stop surfaces into engaging relation with respect to each other while simultaneously moving said one end of said torsion spring out of impacting relation with respect to said lens holding member.

27. The sonar controlled focusing apparatus of claim 26 wherein said return means includes a resilient biasing element for rotating said lens holding member in the direction opposite to which said lens holding member is rotated upon said impact by said torsion spring, said return means biasing element being structured to yield to the impact on said lens holding member made by said torsion spring.

* * * * *